(12) United States Patent
Baumgartner

(10) Patent No.: US 9,322,270 B2
(45) Date of Patent: Apr. 26, 2016

(54) PNEUMATIC DRIVE

(75) Inventor: Florian Baumgartner, München (DE)

(73) Assignee: INNOMOTIX GMBH, Feldkirchen-Westerham (DE)

( * ) Notice: Subject to any disclaimer, the term of this patent is extended or adjusted under 35 U.S.C. 154(b) by 618 days.

(21) Appl. No.: 13/812,961

(22) PCT Filed: Jul. 22, 2011

(86) PCT No.: PCT/EP2011/003696
§ 371 (c)(1),
(2), (4) Date: Jan. 29, 2013

(87) PCT Pub. No.: WO2012/013322
PCT Pub. Date: Feb. 2, 2012

(65) Prior Publication Data
US 2013/0152776 A1    Jun. 20, 2013

(30) Foreign Application Priority Data
Jul. 29, 2010   (DE) .......................... 10 2010 032 750

(51) Int. Cl.
| | | |
|---|---|---|
| F01B 1/01 | (2006.01) | |
| G05D 7/01 | (2006.01) | |
| F16K 17/30 | (2006.01) | |
| F16K 3/12 | (2006.01) | |
| F15B 15/22 | (2006.01) | |
| F01L 17/00 | (2006.01) | |

(52) U.S. Cl.
CPC . *F01B 1/01* (2013.01); *F15B 15/22* (2013.01); *F16K 3/12* (2013.01); *F16K 17/30* (2013.01); *G05D 7/014* (2013.01); *F01L 17/00* (2013.01); *F15B 2211/3057* (2013.01); *F15B 2211/40515* (2013.01); *F15B 2211/755* (2013.01)

(58) Field of Classification Search
CPC ............ F01L 17/00; F16K 3/12; F16K 17/30; B60T 8/342; B60T 8/341; B60T 8/343; G05D 7/014; F15B 2211/3057; F15B 2211/40515; F15B 15/22; F15B 2211/755; F01B 1/01
USPC .............................. 137/498, 500, 504; 91/465
See application file for complete search history.

(56) References Cited

U.S. PATENT DOCUMENTS

| | | | |
|---|---|---|---|
| 5,251,655 A | * | 10/1993 | Low .......................... B67D 1/12 137/501 |
| 6,523,451 B1 | | 2/2003 | Liao et al. |

FOREIGN PATENT DOCUMENTS

| | | |
|---|---|---|
| DE | 1 960 422 | 6/1971 |
| DE | 101 18 867 | 1/2003 |

(Continued)

OTHER PUBLICATIONS

International Search Report for PCT/EP2011/003696 mailed Nov. 15, 2011.

(Continued)

*Primary Examiner* — Dwayne J White
*Assistant Examiner* — Logan Kraft
(74) *Attorney, Agent, or Firm* — Nixon & Vanderhye P.C.

(57) ABSTRACT

The invention relates to a pneumatic drive, comprising a pneumatic drive unit (1), which has a piston (3) that can be moved between a first position and a second position. The piston is accelerated and braked by means of compressed air, which is fed to or led away from the pneumatic drive unit by means of valve arrangements (8, 9) having distribution valves (16, 17, 21, 22). In at least one distribution valve (17, 22), a damping throttle (20, 25) is provided, which has a differential pressure piston (28), which can be moved as a function of the compression pressure, whereby the free throttle cross-section (49) through which the compressed air flows can be changed as a function of the compression pressure.

8 Claims, 3 Drawing Sheets

(56) References Cited

FOREIGN PATENT DOCUMENTS

Figure 2:
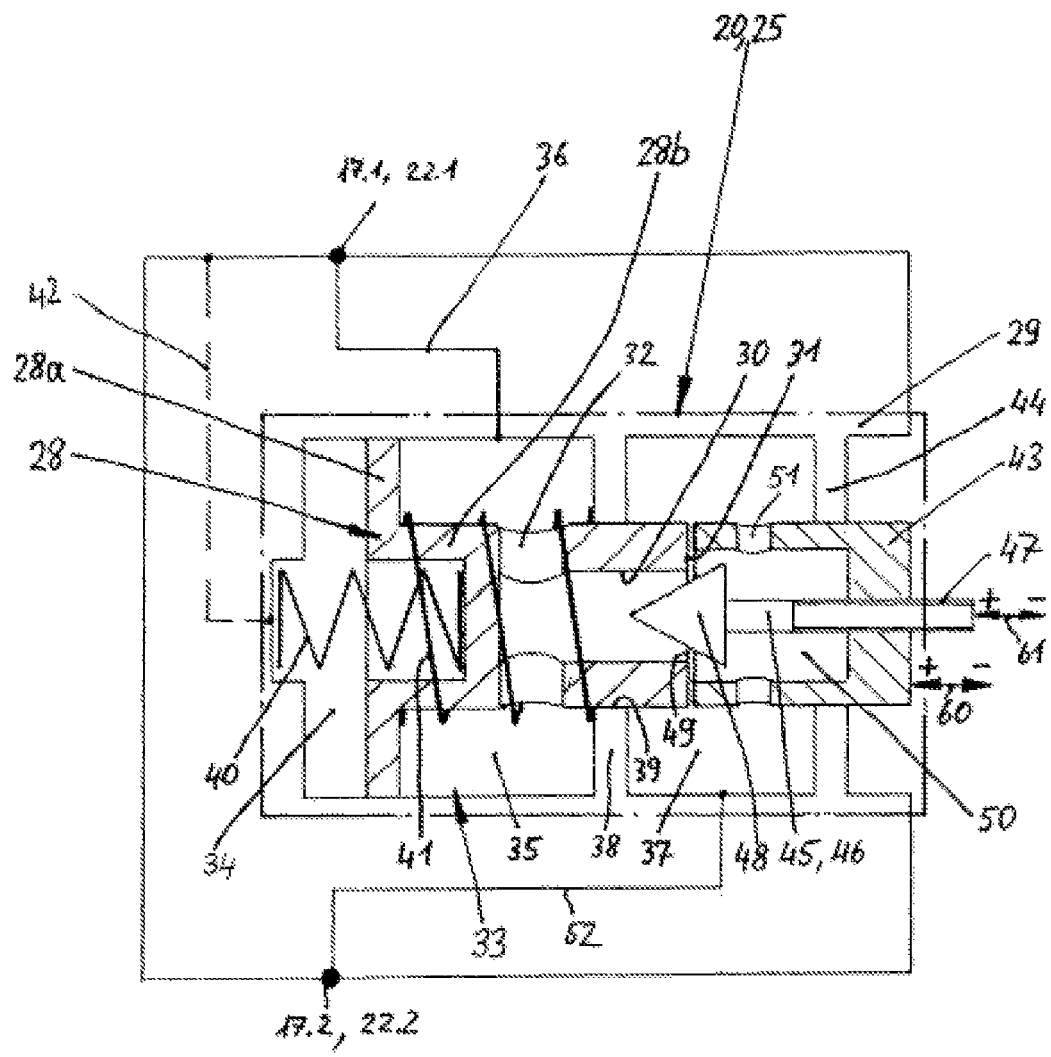

| | | |
|---|---|---|
| DE | 101 38 026 A1 | 3/2003 |
| EP | 1 271 026 B | 1/2003 |
| GB | 1 594 268 A | 7/1981 |

OTHER PUBLICATIONS

Written Opinion of the International Searching Authority mailed Nov. 15, 2011.

\* cited by examiner

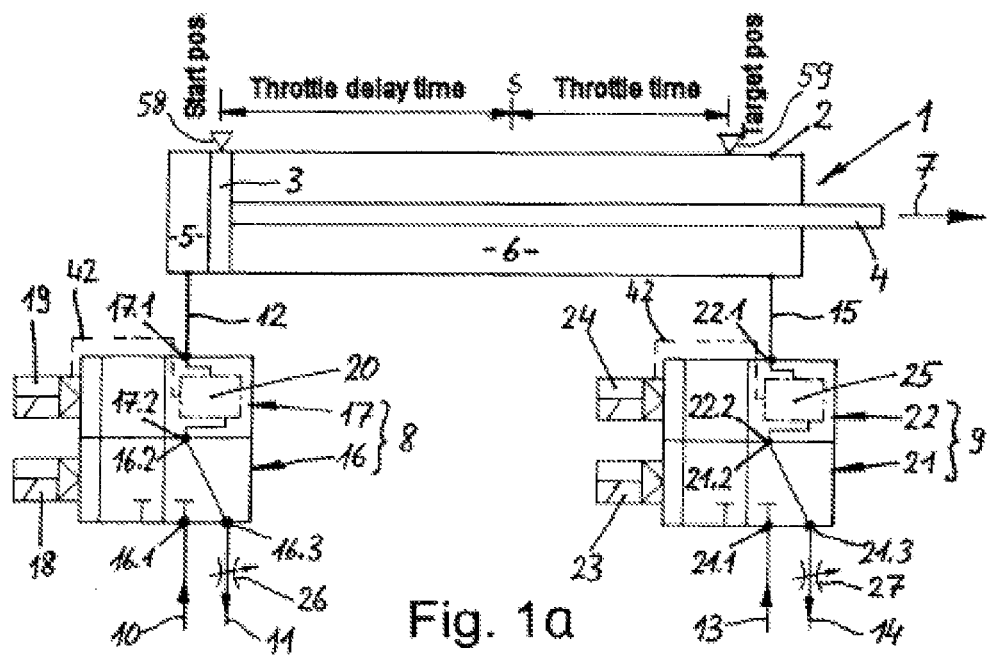
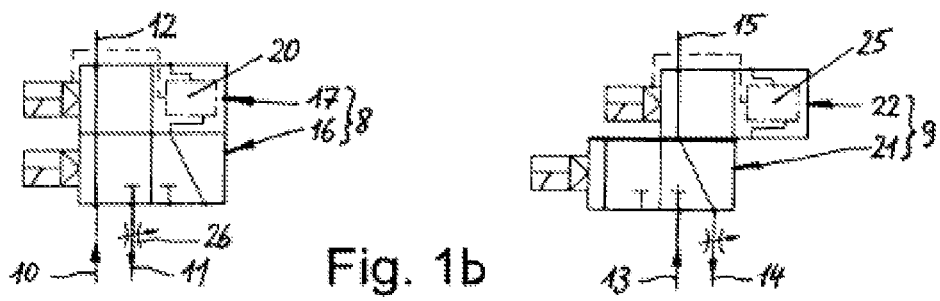
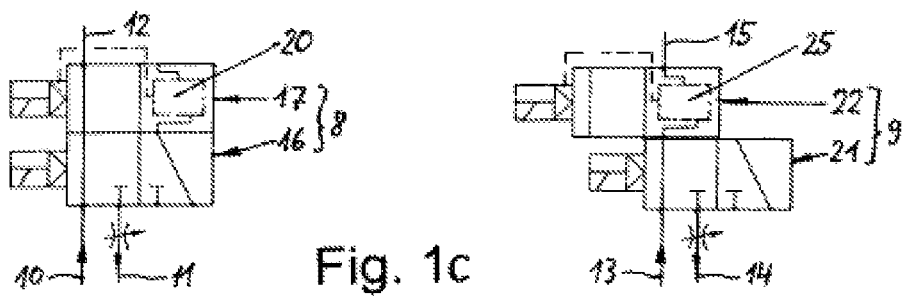
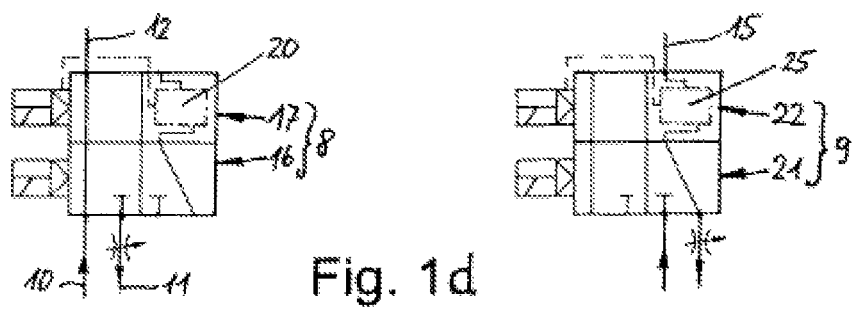
Fig. 1a
Fig. 1b
Fig. 1c
Fig. 1d

PNEUMATIC DRIVE

This application is the U.S. national phase of International Application No. PCT/EP2011/003696 filed 22 Jul. 2011 which designated the U.S. and claims priority to DE 10 2010 032 750.6 filed 29 Jul. 2010, the entire contents of each of which are hereby incorporated by reference.

The invention relates to a pneumatic drive according to the preamble of claim 1.

Highly dynamic pneumatic drive units, in particular pneumatic cylinders and pneumatic pivot drives, are frequently used in industry when high operating speeds are required. One field of use is, for example, the handling of electronic components during production thereof or when the electronic components are being tested.

In order to achieve a high product throughput, it is desirable to operate the pneumatic cylinders or pneumatic pivot drives at the highest possible speed. In this context, it is problematic that the pistons must initially be accelerated and then, towards the end of the piston stroke, when a particular target position is reached, braked to a standstill again very rapidly with a deceleration which is as free from jerks and jolts as possible, in order subsequently to be moved back in the opposite direction.

It is known to attempt to overcome these problems using special position measuring systems and controllable pneumatic servo valves. However, such position measuring systems and controllable servo valves are very expensive, represent an additional external mass at the pneumatic cylinder, require additional space and result in increased electronically governed control complexity.

In order to avoid these drawbacks, a pneumatic drive according to the preamble of claim 1 has already become known from DE 101 38 026 A1, in which drive a compressed air supply line and a compressed air removal line are connected to each work space on each side of the piston of a pneumatic drive unit via two directional control valves arranged in succession. By appropriate switching of these directional control valves, an unthrottled or throttled flow can be provided for the supply or removal of the compressed air, compressed air being actively introduced into the diminishing work space to brake the piston movement.

In this known pneumatic drive, if the piston has not yet fully reached the end position after a particular allocated time has passed, the air located in the diminishing work space is removed via a damping throttle integrated in the control valve. As a result, the piston can be moved to the final end position in a form of "creeping". In this context, it is important that the speed of the piston in the end position does not exceed a particular value of, for example, 0.1 m/sec. This low admissible maximum speed of the piston requires a relatively small free cross-section of the damping throttle via which the compressed air is removed from the diminishing work space of the pneumatic drive unit.

However, this small free cross-section has the result that very high compression pressures can occur in the diminishing work space when the piston, with a load attached thereto, has a high kinetic energy, that is to say when the masses moved and/or speeds are high. However, the maximum admissible compression pressures of the cylinder seals and valve seals are limited. In the case of relatively high kinetic energy, a limitation to the maximum admissible compression pressure must thus be undertaken.

The object of the invention is thus to provide a pneumatic drive of the type mentioned at the outset, by means of which the compression pressure can be changed as simply as possible.

This object is achieved according to the invention by a pneumatic drive having the features of claim 1. Advantageous embodiments of the invention are described in the further claims.

In the pneumatic drive according to the invention, the damping throttle comprises a differential pressure piston which can be moved on the basis of the compression pressure prevailing in the work space, whereby the free throttle cross-section through which the compressed air flows can be changed on the basis of the compression pressure.

If, when the piston is braked, the compression pressure inside the diminishing work space increases so much that there is a risk of the maximum admissible compression pressure being exceeded, the compressed air which is guided through the damping throttle causes such a movement of the differential pressure piston inside the damping throttle that, as a result, the free throttle cross-section is enlarged, and therefore a greater volume flow can flow through and the compression pressure is reduced. As a result, it can easily be ensured that the maximum admissible compression pressure is not exceeded. By contrast, in the case of relatively low compression pressures in the pneumatic cylinder, the free throttle cross-section can be reduced by the differential pressure piston to such a degree that, when the piston to be braked is located just before the end position thereof, it can be braked with the required counterpressure and can be moved on to the end position at a low speed.

According to an advantageous embodiment, the differential pressure piston comprises an axial throttling port. The damping throttle comprises a throttle element having a head portion, the free throttle cross-section being limited by the axial throttling port and the head portion. The free throttle cross-section can thus be adjusted very easily by distancing the differential pressure piston from the preferably conical head portion of the throttle element to a greater or lesser extent.

According to a particularly advantageous embodiment, the damping throttle comprises a stop for limiting the displacement path of the differential pressure piston in the direction of the throttle element, the stop being arranged so as to be adjustable in the direction of movement of the differential pressure piston. If the differential pressure piston rests on the stop, the minimum free throttle cross-section is set as a result. The further removed the differential pressure piston is from the stop and thus from the throttle element, the greater the free throttle cross-section and thus the volume flow which can flow through this throttle cross-section. By changing the position of the stop, the spring forces acting on the differential pressure piston, and thus the threshold value of the compression pressure from which the differential pressure piston begins to move away from the stop, can also be changed.

According to another advantageous embodiment, a second differential pressure piston is displaceably mounted in the differential pressure piston, is biased in the direction of the throttle element by means of a spring and reduces the diameter of the axial throttling port in a region adjacent to the head portion of the throttle element. In this embodiment, owing to the smaller integrated second differential pressure piston, a desired enlargement in throttle cross-section for faster build-up of the compression pressure is achieved right at the start of the damping process and a shorter damping stroke is achieved without the larger differential pressure piston needing to be displaced for this purpose.

Figure 3:
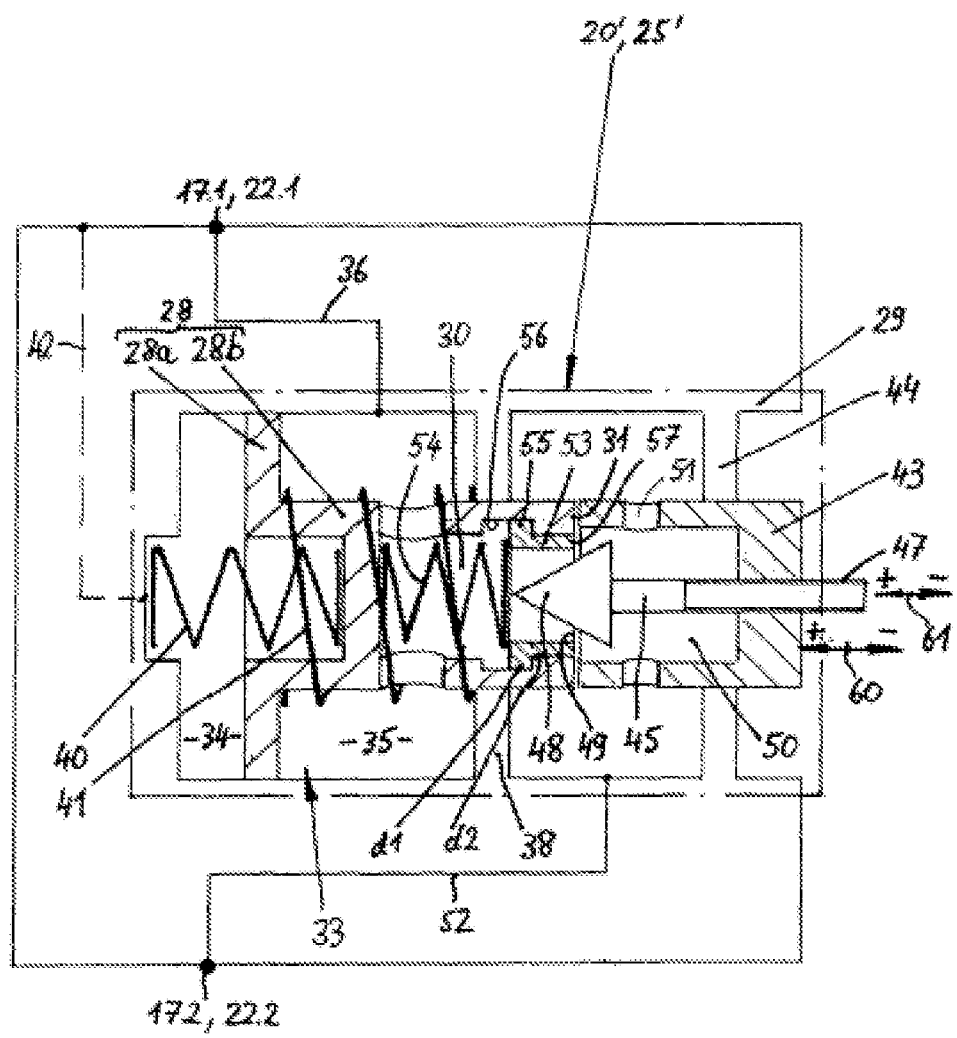

The invention will be described in detail below by way of example with reference to the drawings, in which:

FIG. 1a is a schematic diagram of a pneumatic drive according to the invention in the unpressurised state, the damping throttles being shown schematically, FIG. 1b shows the switch position of the first and second valve arrangement when the piston leaves the start position, FIG. 1c shows the switch position of the first and second valve arrangement when the active damping (braking) of the piston by an increase in counterpressure begins, FIG. 1d shows the switch position of the first and second valve arrangement when the piston has not reached the target position after the allocated time has elapsed or when forces must be exerted by the piston in the end position, FIG. 2 is a more detailed view of the damping throttle from FIGS. 1a and 1b according to a first embodiment of the invention, and FIG. 3 is a more detailed view of the damping throttle from FIG. 1a to 1d according to a second embodiment of the invention.

FIG. 1a shows a pneumatic drive unit 1 in the form of a pneumatic cylinder having a cylindrical housing 2 in which a piston 3 having a piston rod 4 is longitudinally displaceably guided. The piston 3 divides the interior of the housing 2 into a work space 5 which is located to the left of the piston 3 in FIG. 1a and a work space 6 which is arranged to the right of the piston 3. In FIG. 1a, the piston 3 is located in the position thereof located furthest to the left, which is referred to herein as the start position or first position. From this start position, the piston 3 can be displaced to the right, as indicated by the arrow 7, into a second position, which is referred to herein as the target position and is the end position, located furthest to the right, of the piston 3.

The movement of the piston 3 is brought about by compressed air, which is supplied and removed via a first valve arrangement 8 and a second valve arrangement 9.

The first valve arrangement 8 is connected on one hand to a compressed air supply line 10 and a compressed air removal line 11 and on the other hand to a line 12 which discharges into the left-hand work space 5.

The second valve arrangement 9 is connected on one hand to a compressed air supply line 13 and a compressed air removal line 14 and on the other hand to a line 15 which discharges into the right-hand work space 6.

FIG. 1a shows that the first valve arrangement 8 consists of two interacting directional control valves 16, 17. The first directional control valve 16 is designed as a 3/2-port directional control valve and thus has three ports 16.1, 16.2, 16.3 and two possible switch positions. The port 16.1 is connected to the compressed air supply line 10, while the port 16.3 is connected to the compressed air removal line 11. The switch between the two switch positions takes place by means of an electromagnetic valve 18.

The second directional control valve 17 is designed as a 2/2-port directional control valve and thus has two ports 17.1 and 17.2 which can be switched to two different switch positions. The port 17.1 is connected to the line 12 which discharges into the left-hand work space 5, while the port 17.2 is connected to the port 16.2 of the first directional control valve 16.

The second directional control valve 17 of the left-hand valve arrangement 8 further comprises a damping throttle 20, which is shown only schematically in FIGS. 1a to 1d and is designed as an adjustable throttle valve. The damping throttle 20 will be described in more detail below with reference to FIGS. 2 and 3. In the switch position shown in FIG. 1a of the second directional control valve 17, the line 12 which discharges into the left-hand work space 5 is connected to the compressed air removal line 11 via the damping throttle 20.

The damping throttle 20 is located inside the 2/2-port directional control valve 17.

The second, right-hand valve arrangement 9 is identical to the first valve arrangement 8. It consists of a first directional control valve 21 in the form of a 3/2-port directional control valve and a second directional control valve 22 which interacts therewith in the form of a 2/2-port directional control valve. The ports of the first directional control valve 21 are denoted 21.1, 21.2, 21.3. The ports of the second directional control valve 22 are denoted 22.1 and 22.2. The switch between the two switching states takes place by means of electromagnetic valves 23, 24. The ports 21.1, 21.3 are connected to the compressed air supply line 13 and to the compressed air removal line 14 respectively, the port 21.2 is connected to the port 22.2, and the port 22.1 is connected to the line 15 which leads to the right-hand work space 6 of the pneumatic drive unit 1.

In addition, an adjustable damping throttle 25, which is identical to the damping throttle 20 and will be described in more detail below with reference to FIGS. 2 and 3, is also integrated into the second directional control valve 22 of the second valve arrangement 9.

FIG. 1a to 1d also show that another adjustable throttle valve 26, 27 is arranged in each of the two compressed air removal lines 11, 14 outside the valve arrangements 8, 9. By means of these optionally provided throttle valves 26, 27, the amount of compressed air to be removed and thus the piston speed can also be adjusted.

The construction and mode of operation of the present pneumatic drive basically correspond to that described in DE 101 38 026 A1, the disclosure in which is explicitly made the subject matter of the present application. The mode of operation of the pneumatic drive shown in FIG. 1a-1d will therefore merely be summarised briefly.

The starting point is the left-hand end position of the piston 3, which position is shown in FIG. 1a and can also be referred to as the start position. From this start position, the piston 3 is to be displaced rightwards to its opposite end position, which can also be referred to as the target position.

In the left-hand limit position of the piston 3, the two left-hand directional control valves 16, 17 of the first valve arrangement 8 are initially switched as shown in FIG. 1b. Compressed air can flow unthrottled from the compressed air supply line 10 to the line 12 and from there into the left-hand work space 5. The pressure which rapidly builds up on the primary side in the work space 5 then begins to move the piston 3 rightwards with maximum acceleration. At the same time the second, right-hand valve arrangement 9 is switched such that the air displaced from the diminishing secondary work space 6 can be removed via the compressed air removal line 14. By appropriate adjustment of the throttle valve 27, the speed at which the piston 3 is moved rightwards can be adjusted. In addition, when the piston 3 leaves the start position, a preset throttle delay time is started via a position switch 58 and the actual time measurement is begun.

After the throttle delay time has elapsed, the second valve arrangement 9 switches to a position which is shown in FIG. 1c. In this switch position, the right-hand compressed air supply line 13 is connected via the damping throttle 25 to the line 15 and thus to the diminishing work space 6. In this state, compressed air is actively fed into the diminishing work space 6, and therefore the counterpressure building up there increases progressively and the piston 3 is braked very rapidly to a standstill. By appropriate adjustment of the damping throttle 25, the damping behaviour, that is to say the braking behaviour, can be adjusted and varied by means of an active counterpressure increase. The position shown in FIG. 1c of the second valve arrangement 9 is generally maintained until the piston 3 has reached the target position, which is detected by means of a position switch 59 (FIG. 1a). When the target position is reached, the actual time measurement is also stopped and compared with the allocated time. If the actual time deviates from the allocated time, the start time S for the throttle time (time of the active counterpressure increase in the diminishing work space 6) can accordingly be shifted forward or back.

Throughout the throttle time, the first valve arrangement 8 is also located in the same position as during the throttle delay time.

If the piston 3 has not yet reached the target position after the allocated time has elapsed, the second valve arrangement 9 is switched to the position shown in FIG. 1d. In this position the compressed air can flow from the diminishing work space 6 via the damping throttle 25 and also via the throttle valve 27, that is to say is throttled twice. The piston 3 can thus be moved to the target position in a form of "creeping". In the event that the target position is reached during the allocated time, the position shown in FIG. 1d of the second valve arrangement 9 is optional.

A first embodiment of a damping throttle 20, 25 according to the invention, which allows a throttle cross-section change which is dynamically controlled and dependent on the differential pressure, will be described below with reference to FIG. 2. Owing to such a dynamically controlled throttle cross-section change, the compression pressure inside the pneumatic cylinder 1 and inside the valve arrangements 8, 9 is automatically limited such that the maximum admissible compression pressure, which is predetermined in particular by the cylinder seals and valve seals, is not exceeded. At the same time, a damping throttle 20, 25 of this type allows slow movement of the piston 3 into its target or end position, for which purpose a small free throttle cross-section is required.

The damping throttle 20, 25 shown in FIG. 2 comprises a differential pressure piston 28 which is longitudinally displaceable in a valve housing 29 shown only schematically in FIG. 2. The differential pressure piston 28 comprises a piston portion 28a having a relatively large outer diameter and a piston portion 28b having a relatively small outer diameter. In addition, the differential pressure piston 28 comprises an axial throttling port 30 which, starting from an end wall 31, extends only over part of the piston portion 28b and is connected to radial holes 32.

The piston portion 28a having the larger diameter is arranged in a first chamber 33 of the valve housing 29 and divides it into a first pressure space 34, which is located on the left-hand side of the piston portion 28a in FIG. 2, and a second pressure space 35 which is arranged on the opposite side of the piston portion 28a. The radial holes 32 open into the second pressure space 35. In addition, the second pressure space 35 is connected via a line 36 to the port 17.1, 22.1 of the directional control valve 17, 22, and thus has a compressed air connection to the work space 5 and 6 respectively of the pneumatic drive unit 1.

The valve housing 29 further comprises, in addition to the first chamber 33, a second chamber 37, which is separated from the first chamber 33 by a wall 38. The piston portion 28b penetrates a passage 39 in the wall 38, is displaceably mounted in the wall 38 and extends into the second chamber 37.

A first spring 40 is arranged in the first pressure space 34 and is supported at one end on the left-hand wall of the pressure space 34 and at the other end on the differential pressure piston 28. The first spring 40 is designed as a compression spring and attempts to push the differential pressure piston 28 to the right.

A second spring 41 is arranged in the second pressure space 35 and is supported at one end on the piston portion 28a of the differential pressure piston 28 and at the opposite end on the wall 38. The second spring 41 is likewise designed as a compression spring and attempts to push the differential pressure piston 28 to the left, against the spring force of the first spring 40 and against the air pressure in the first pressure space 34, which is built up in the first pressure space 34 via a line 42 shown by a dotted line.

The stroke movement of the differential pressure piston 28 rightwards is limited by an adjustable stop 43. In the embodiment shown, the stop 43 has the shape of a hollow cylinder and is mounted in a wall 44 of the valve housing 29. The wall 44 limits the second chamber 37 of the valve housing 29 outwardly in the axial direction.

A throttle element 45 in the form of a throttle screw is fixed in a longitudinally adjustable manner in the stop 43. A screw shaft 46 having a thread 47 is screwed into an axial threaded hole in the outer end wall of the stop 43 for this purpose.

The throttle element 45 comprises at its inner end a conical head portion 48, the tip of which, in the position shown in FIG. 2, in which the differential pressure piston 28 is located close to the stop 43 or rests against said stop, extends into the axial throttling port 30 of the differential pressure piston 28. As a result, the free throttle cross-section 49 between the peripheral wall of the axial throttling port 30 and the head portion 48 is greatly reduced. If the differential pressure piston 28 is located at the stop 43, this produces the smallest free throttle cross-section 49. This smallest free throttle cross-section 49 is expediently set in such a way by adjusting the throttle element 45 in the (+) or (−) direction (see double arrow 61) relative to the stop 43 that, when the piston 3 is moved into the end position, the smallest desired end speed is achieved in the region of the last millimeter before the end position is reached.

By adjusting the stop 43 in the (+) direction relative to the valve housing 29 (see double arrow 60), the differential pressure piston 28 is shifted leftwards, whereby the spring force F2 of the second spring 41 is reduced and the spring force F1 of the first spring 40 is increased. As a result, the desired compression pressure pksoll increases according to the state of equilibrium F (pksoll)+F2=F (p)+F1. In this context, F (pksoll) means the force with which the differential pressure piston 28 is pushed leftwards (FIG. 2) by the desired compression pressure pksoll in the second pressure space 35. F (p) means the force with which the differential pressure piston 28 is pushed rightwards by the introduction of compressed air at the pressure (p) into the first pressure space 34. When the stop 43 is adjusted in the (−) direction the opposite occurs, that is to say the desired compression pressure pksoll is reduced. A relatively high compression pressure can thus also be set as the operating pressure via the use of the first spring 40.

The axial throttling port 30 is in fluid communication with a third pressure space 50, located inside the stop 43, via the free throttle cross-section 49. This third pressure space 50 in turn has a compressed air connection to the second chamber 37 via radial outlets 51 in the stop 43. The second chamber 37 is connected to the port 17.2, 22.2 via a line 52.

The function of the damping throttle 20, 24 in the damping phase—as shown in FIG. 1c—in which the piston 3 moves towards the target position and, after its initial acceleration, is braked again, will be described in detail below. As described with reference to FIG. 1c, in this phase compressed air is fed into the diminishing work space 6 via the compressed air supply line 13 and the damping throttle 25 to achieve particularly rapid braking of the piston 3.

As long as the compression pressure inside the work space 6 of the pneumatic cylinder 1 is less than or equal to the set (desired) compression pressure pksoll, the differential pressure piston 28 rests against the stop 43. If the compression pressure exceeds the target value pksoll owing to the diminishing work space 6 and owing to the (optional) supply of the compressed air via the compressed air supply line 13, then the differential pressure piston 28 is lifted off the stop 43 and moves increasingly far away from the conical head portion 38 of the throttle element 45, whereby the free throttle cross-section 49 is enlarged. The pressure in the second pressure space 35 and thus the compression pressure in the diminishing work space 6 of the pneumatic cylinder 1 can thereby be reduced and optionally compared with the pressure which prevails in the third pressure space 50 or in the second chamber 37. If the compression pressure falls to or below the target value pksoll, then the differential pressure piston 28 comes to rest on the stop 43 again as the throttle cross-section 49 diminishes. This continuous control loop is ended when the piston 3 is at a standstill.

The function described also applies to the operating state of the pneumatic drive in which the second valve arrangement 9 is located in the position shown in FIG. 1*d*.

A second embodiment of a damping throttle 20', 25' according to the invention, which can be used in the pneumatic drive in FIG. 1*a*, will be described below with reference to FIG. 3.

The damping throttle 20', 25' comprises all the components described in connection with the damping throttle 20, 25 of the first embodiment, and therefore reference is made thereto to avoid repetition.

The second embodiment differs from the first embodiment in that a second differential pressure piston 53 is arranged inside the axial throttling port 30 of the differential pressure piston 28 and is pushed towards the throttle element 45 by means of a third spring 54, but can be displaced relative to the differential pressure piston 28 by the compressed air supplied via the line 52 (for braking the piston 3) in such a way that the free throttle cross-section 49 is enlarged before the differential pressure piston 28 moves.

The second differential pressure piston 53 is sleeve-shaped and rests on the peripheral wall of the axial throttling port 30. A radially outwardly extending shoulder 55 of the second differential pressure piston 53 engages in a radial peripheral recess 56 in the differential pressure piston 28 and serves as a stop for limiting the axial displacement path of the second differential pressure piston 53. In the position shown in FIG. 3, in which the second differential pressure piston 53 is located in its position located furthest to the right, the end wall 57 of the second differential pressure piston 53 is aligned with the end wall 31 of the differential pressure piston 28. The inner diameter of the axial throttling port 30 of the differential pressure piston 28 is clearly reduced by the wall thickness of the second differential pressure piston 53.

The spring stiffness of the third spring 54 is made such that, when compressed air is supplied via the line 52, that is to say when the second valve arrangement 9 is located in the position shown in FIG. 1*c*, the second differential pressure piston 53 moves relative to the differential pressure piston 28 before the differential pressure piston 28 is displaced. The displacement of the second differential pressure piston 53 brings about an enlargement of the free throttle cross-section 49. In contrast to the first embodiment, in which the free throttle cross-section 49 is enlarged only when the desired compression pressure pksoll is reached or exceeded, in the second embodiment, owing to a smaller integrated differential pressure piston 53 and the third spring 54, a desired enlargement of the free throttle cross-section 49 for faster build-up of the compression pressure right at the start of the damping process and a shorter damping stroke is achieved. The second differential pressure piston 53 is reset to the smallest free throttle cross-section 49 before the desired compression pressure pksoll is reached and before the differential pressure piston 28 is restored to the stop 43 owing to an adapted ratio between the diameter d1 of the shoulder 55 and the diameter d2 of the throttling port 30 and the third spring 54.

The damping throttle (20, 24, 20', 25') described can be used in pneumatic drives in which air is actively fed into the diminishing work space 6 during the braking process of the piston 3, and in pneumatic drives without an active introduction of counter air of this type, in which the piston 3 is braked exclusively by the throttled removal of air.

The invention claimed is:

1. Pneumatic drive comprising
a pneumatic drive unit which comprises a piston which can be moved between a first and a second position,
a first valve arrangement which is connected to a first compressed air supply line and a first compressed air removal line and via which compressed air can be supplied to and removed from a first work space of the pneumatic drive unit,
a second valve arrangement which is connected to a second compressed air supply line and a second compressed air removal line and via which compressed air can be supplied to and removed from a second work space arranged on the opposite side of the piston,
the first and second valve arrangements each comprising a directional control valve having a damping throttle for limiting the air volume flow flowing through the directional control valve,
wherein the damping throttle comprises a differential pressure piston which can be displaced on the basis of the compression pressure prevailing in the work space, whereby a free throttle cross-section, through which the air flows, of the damping throttle can be changed on the basis of the compression pressure, in that the differential pressure piston comprises an axial throttling port, and in that the damping throttle comprises a throttle element having a head portion, the free throttle cross-section being limited by the peripheral wall of the axial throttling port and the head portion,
wherein the damping throttle comprises a stop for limiting the displacement path of the differential pressure piston in the direction of the throttle element, the stop being arranged so as to be adjustable in the direction of movement of the differential pressure piston.

2. Pneumatic drive according to claim 1, wherein the head portion of the throttle element consists of a conical tip.

3. Pneumatic drive according to claim 1, wherein the throttle element consists of a throttle screw, the reach of which can be changed.

4. Pneumatic drive according to claim 3, wherein the throttle element is displaceably mounted on the stop in such a way that the position of the head portion relative to the stop can be changed.

5. Pneumatic drive comprising
a pneumatic drive unit which comprises a piston which can be moved between a first and a second position,
a first valve arrangement which is connected to a first compressed air supply line and a first compressed air removal line and via which compressed air can be supplied to and removed from a first work space of the pneumatic drive unit, a second valve arrangement which is connected to a second compressed air supply line and a second compressed air removal line and via which compressed air can be supplied to and removed from a second work space arranged on the opposite side of the piston, the first and second valve arrangements each comprising a directional control valve having a damping throttle for limiting the air volume flow flowing through the directional control valve, wherein the damping throttle comprises a differential pressure piston which can be displaced on the basis of the compression pressure prevailing in the work space, whereby a free throttle cross-section, through which the air flows, of the damping throttle can be changed on the basis of the compression pressure, in that the differential pressure piston comprises an axial throttling port, and in that the damping throttle comprises a throttle element having a head portion, the free throttle cross-section being limited by the peripheral wall of the axial throttling port and the head portion, wherein a second differential pressure piston (53) through which the compressed air can flow is displaceably mounted in the differential pressure piston, is biased in the direction of the throttle element by means of a spring, and reduces the diameter of the axial throttling port in a region adjacent to the head portion of the throttle element.

6. Pneumatic drive according to claim 5, wherein the head portion of the throttle element consists of a conical tip.

7. Pneumatic drive according to claim 5, wherein the throttle element consists of a throttle screw, the reach of which can be changed.

8. Pneumatic drive according to claim 7, wherein the throttle element is displaceably mounted on a stop in such a way that the position of the head portion relative to the stop can be changed.

\* \* \* \* \*